(12) United States Patent
Fujimaru et al.

(10) Patent No.: US 11,680,871 B2
(45) Date of Patent: Jun. 20, 2023

(54) ROLLING BEARING TEST DEVICE, AND METHOD FOR TESTING ROLLING BEARING

(71) Applicants: JTEKT CORPORATION, Kariya (JP); KANDA CO. LTD, Habikino (JP)

(72) Inventors: Satoshi Fujimaru, Kashiwara (JP); Yousuke Nagano, Yao (JP); Yuzuru Takahashi, Kashiwara (JP); Nobuhiro Kanda, Habikino (JP); Syuichi Miyabe, Osaka (JP)

(73) Assignees: JTEKT CORPORATION, Kariya (JP); KANDA CO. LTD, Habikino (JP)

( * ) Notice: Subject to any disclaimer, the term of this patent is extended or adjusted under 35 U.S.C. 154(b) by 20 days.

(21) Appl. No.: 17/618,218

(22) PCT Filed: Jun. 8, 2020

(86) PCT No.: PCT/JP2020/022572
§ 371 (c)(1),
(2) Date: Dec. 10, 2021

(87) PCT Pub. No.: WO2020/250857
PCT Pub. Date: Dec. 17, 2020

(65) Prior Publication Data
US 2022/0170820 A1    Jun. 2, 2022

(30) Foreign Application Priority Data

Jun. 12, 2019  (JP) .............................. JP2019-109139
Apr. 23, 2020  (JP) .............................. JP2020-076874

(51) Int. Cl.
*G01M 13/04*    (2019.01)
(52) U.S. Cl.
CPC .................... *G01M 13/04* (2013.01)

(58) Field of Classification Search
CPC ...................................................... G01M 13/04
See application file for complete search history.

(56) References Cited

U.S. PATENT DOCUMENTS

| 3,387,485 A * | 6/1968 | Hall ...................... G01M 13/04 73/9 |
| 10,288,525 B2 * | 5/2019 | Ferm ...................... G01M 9/04 |

(Continued)

FOREIGN PATENT DOCUMENTS

| JP | S33-002433 B1 | 4/1958 |
| JP | S56-149903 A | 11/1981 |

(Continued)

OTHER PUBLICATIONS

Aug. 11, 2020 International Search Report issued in International Patent Application No. PCT/JP2020/022572.

(Continued)

*Primary Examiner* — Eric S. McCall
(74) *Attorney, Agent, or Firm* — Oliff PLC

(57) ABSTRACT

A rolling bearing test includes: a hermetic container configured to allow atmosphere gas to be introduced therein; a rotary shaft housed in the hermetic container and fitted into the rolling bearing; a pair of shaft support portions fixed to a fixing portion provided in the hermetic container and configured to rotatably support the rotary shaft at both sides of the rolling bearing in an axial direction, respectively; a drive device configured to drive the rotary shaft; a holding portion configured to hold the outer ring of the rolling bearing to avoid rotation of the outer ring; a first load application mechanism configured to apply an axial load between the inner ring and the outer ring of the rolling bearing; and a second load application mechanism.

9 Claims, 7 Drawing Sheets

(56) References Cited

U.S. PATENT DOCUMENTS

| | | | |
|---|---|---|---|
| 10,371,598 B1* | 8/2019 | Nation | G01M 13/04 |
| 2016/0025592 A1* | 1/2016 | Lee | G01N 29/045 |
| | | | 73/645 |
| 2016/0033362 A1* | 2/2016 | Taguchi | G01M 13/045 |
| | | | 73/593 |
| 2016/0139000 A1* | 5/2016 | Karasawa | G01M 13/04 |
| | | | 73/865.9 |
| 2016/0282225 A1* | 9/2016 | Teramoto | G01M 13/045 |
| 2018/0045607 A1* | 2/2018 | Elmose | G01M 13/04 |
| 2018/0136081 A1* | 5/2018 | Lee | G01D 5/28 |
| 2022/0026309 A1* | 1/2022 | Staudigel | G01M 13/04 |

FOREIGN PATENT DOCUMENTS

| | | |
|---|---|---|
| JP | S63-225137 A | 9/1988 |
| JP | H07-092056 A | 4/1995 |
| JP | 2011-117953 A | 6/2011 |
| JP | 2015-068749 A | 4/2015 |
| JP | 2015-175779 A | 10/2015 |

OTHER PUBLICATIONS

Aug. 11, 2020 Written Opinion issued in International Patent Application No. PCT/JP2020/022572.

* cited by examiner

ROLLING BEARING TEST DEVICE, AND METHOD FOR TESTING ROLLING BEARING

TECHNICAL FIELD

The present invention relates to a rolling bearing test device and a method for testing a rolling bearing.

BACKGROUND ART

Patent Literature 1 mentioned below relates to a test device for testing a thrust ball bearing in a hydrogen gas atmosphere.

CITATION LIST

Patent Literature

Patent Literature 1: JP-A-2015-068749

Although the test device described in Patent Literature 1 is configured to be capable of performing a test while applying a load in a thrust direction, in an actual use environment it applies loads in directions other than the thrust direction. The accuracy of a test can be increased if load conditions in an actual use environment can be reproduced more properly.

SUMMARY OF INVENTION

According to embodiments of the present invention, a bearing test device and a method for testing a rolling bearing can reproduce load conditions that are closer to those in an actual use environment in a prescribed atmosphere gas.

In an embodiment of the invention, a rolling bearing test device configured to test a rolling bearing including an inner ring and an outer ring, the rolling bearing test device includes: a hermetic container configured to allow atmosphere gas to be introduced therein; a rotary shaft housed in the hermetic container and fitted into the rolling bearing; a pair of shaft support portions fixed to a fixing portion provided in the hermetic container and configured to rotatably support the rotary shaft at both sides of the rolling bearing in an axial direction, respectively; a drive device configured to drive the rotary shaft; a holding portion configured to hold the outer ring of the rolling bearing to avoid rotation of the outer ring; a first load application mechanism configured to apply an axial load between the inner ring and the outer ring of the rolling bearing; and a second load application mechanism configured to apply a radial load between the inner ring and the outer ring of the rolling bearing by applying a radial load between the holding portion and the fixing portion.

The rolling bearing test device having the above configuration can apply an axial load between the inner ring and the outer ring of the rolling bearing and, at the same time, apply a radial load between the inner ring and the outer ring of the rolling bearing by applying a radial load between the holding portion and the fixing portion, by means of the first load application mechanism and the second load application mechanism. This makes it possible to apply an axial load and a radial load to the rolling bearing at the same time in a prescribed atmosphere gas and hence to reproduce load conditions that are closer to those in an actual use environment.

In the above rolling bearing test device, the drive device may be provided outside the hermetic container, and the rolling bearing test device may further include a non-contact coupling configured to transmit drive power of the drive device to the rotary shaft.

In this case, drive power can be transmitted from outside the hermetic container without having the rotary shaft penetrate through the hermetic container from inside to outside, whereby the sealing performance of the hermetic container can be increased.

In the above rolling bearing test device, the first load application mechanism may include: a first beam penetrating through a wall portion of the hermetic container; a first support portion configured to support the first beam to allow one end portion of the first beam to be displaced such that a displacement has a component that is in parallel with the axial direction of the rotary shaft; and a pushing portion provided between the one end portion of the first beam and the inner ring or the outer ring of the rolling bearing, and the second load application mechanism may include: a second beam penetrating through the wall portion of the hermetic container; a second support portion configured to support the second beam to allow one end portion of the second beam to be displaced such that a displacement has a component that is in parallel with a radial direction of the rotary shaft; and an arm connecting the one end portion of the second beam and the holding portion.

In this case, since an axial load and a radial load can be applied to the rolling bearing by imposing loads to respective rolling mearings via the other end portion of the first beam and the other end portion of the second beam located outside the hermetic container, the degrees of freedom of the manner of applying loads such as load application patterns and applied load values can be increased. Furthermore, temporal variations of applied loads can be monitored from outside the hermetic container via the first beam and the second beam separately for an axial load and a radial load. Furthermore, each of an axial load and a radial load can be varied while the rolling bearing is rotated.

The above rolling bearing test device may further include a first bellows configured to seal up a space between a first opening which is formed in the wall portion and through which the first beam penetrates and an outer side surface of the first beam; and a second bellows configured to seal up a space between a second opening which is formed in the wall portion and through which the second beam penetrates and an outer side surface of the second beam.

In this case, the first opening and the second opening can be sealed up without restricting the movement of the first beam and the second beam.

In the above rolling bearing test device, at least one of the pair of shaft support portions may include another rolling bearing including inner and outer rings and configured to support the rotary shaft, the rolling bearing test device may further include a ring-shaped member disposed on an outer circumferential surface side of the rotary shaft and interposed between the inner ring of the rolling bearing and the inner ring of the another rolling bearing whose outer ring is supported by the fixing portion in a radial direction, and the first load application mechanism may be configured to apply the axial load between the inner ring and the outer ring of the rolling bearing via the another rolling bearing and the ring-shaped member by pushing the inner ring or the outer ring of the another rolling bearing in the axial direction.

In this case, an axial load and a radial load can be applied to the another rolling bearing and hence the another rolling bearing can be made a test target. Thus, a number of rolling bearings can be tested by one test.

In the above rolling bearing test device, the hermetic container may have a lead-out port allowing an inside and an outside of the hermetic container to communicate and a lead-in port allowing the inside and the outside of the hermetic container to communicate, the rolling bearing test device may further include a suction/discharge device configured to suck atmosphere gas existing in the hermetic container through the lead-out port and discharge the sucked atmosphere gas so as to be introduced into the hermetic container through the lead-in port, the lead-out port may be provided upper in a vertical direction than any of an uppermost end of an outer raceway surface of the rolling bearing in the vertical direction and uppermost ends of sliding portions of the pair of shaft support portions in the vertical direction, and the lead-in port is provided lower than the lead-out port in the vertical direction.

In this case, an atmosphere gas flow can be generated inside the hermetic container by sucking atmosphere gas existing inside the hermetic container through the lead-out port and discharging atmosphere gas into the hermetic container through the lead-in port, whereby the atmosphere gas existing in the hermetic container can be stirred.

When the rolling bearing is tested, the rolling bearing and the shaft support portions that support the rolling bearing wear and produce wear debris. Atmosphere gas containing such wear debris sucked by the suction/discharge device may cause a failure of the suction/discharge device.

In this connection, the lead-out port employed in the invention is located above, in the vertical direction, any of the uppermost end, in the vertical direction, of the outer raceway surface of the rolling bearing and the uppermost ends, in the vertical direction, of the outer raceway surfaces which are the sliding portions of the pair of shaft support portions. Most of wear debris drops downward in the vertical direction. Thus, wear debris is not prone to be mixed with atmosphere gas that exists in the vicinity of the lead-out port and is to be sucked out through it. As a result, the probability of occurrence of an event that the suction/discharge device sucks wear debris can be lowered and the probability that wear debris affects the suction/discharge device can be suppressed.

The above rolling bearing test device may further include an introduction pipe configured to introduce the atmosphere gas discharged from the suction/discharge device to the lead-in port and an atmosphere gas heating/cooling device configured to heat or cool the atmosphere gas passing through the introduction pipe.

In this case, heated or cooled atmosphere gas is discharged to inside the hermetic container. Thus, the temperature of the atmosphere gas inside the hermetic container can be adjusted more efficiently than in a case the atmosphere gas is heated or cooled indirectly from outside the hermetic container.

In supplying atmosphere gas to inside the hermetic container, if a difference exists between the temperature of atmosphere gas being supplied and that of the atmosphere gas existing inside the hermetic container, a phenomenon may occur that the temperature of the atmosphere gas existing inside the hermetic container varies and the temperature of the hermetic container varies accordingly, whereby variations occur in loads applied to the rolling bearing.

In contrast, in the above rolling bearing test device, the hermetic container may have a supply port allowing an inside and an outside of the hermetic container to communicate, and the rolling bearing test device may further include: a supply pipe configured to introduce, to the supply port, the atmosphere gas to be supplied to the inside of the hermetic container and a supply gas heating/cooling device configured to heat or cool the atmosphere gas passing through the supply pipe.

With this measure, the temperature of atmosphere gas to be supplied to inside the hermetic container can be adjusted so as to become equal to that of the gas existing in the hermetic container before it is supplied to inside the hermetic container, whereby variations of loads applied to the rolling bearings due to a temperature variation of the hermetic container can be suppressed.

According to the embodiment of the invention, a method for testing a rolling bearing using the above-described rolling bearing test device, the method includes: fitting the rolling bearing onto the rotary shaft and supporting the rotary shaft rotatably by the pair of shaft support portions in the hermetic container; introducing the atmosphere gas into the hermetic container; and causing the rotary shaft to rotate by the drive device while applying the axial load between the inner ring and the outer ring of the rolling bearing by the first load application mechanism and applying the radial load between the inner ring and the outer ring of the rolling bearing by applying the radial load between the holding portion and the fixing portion by the second load application mechanism.

The above constitution makes it possible to reproduce load conditions that are closer to those in an actual use environment in a prescribed atmosphere gas.

The embodiments of the invention make it possible to reproduce load conditions that are closer to those in an actual use environment in a prescribed atmosphere gas.

DESCRIPTION OF EMBODIMENTS

[Overall Configuration]

Figure 1:
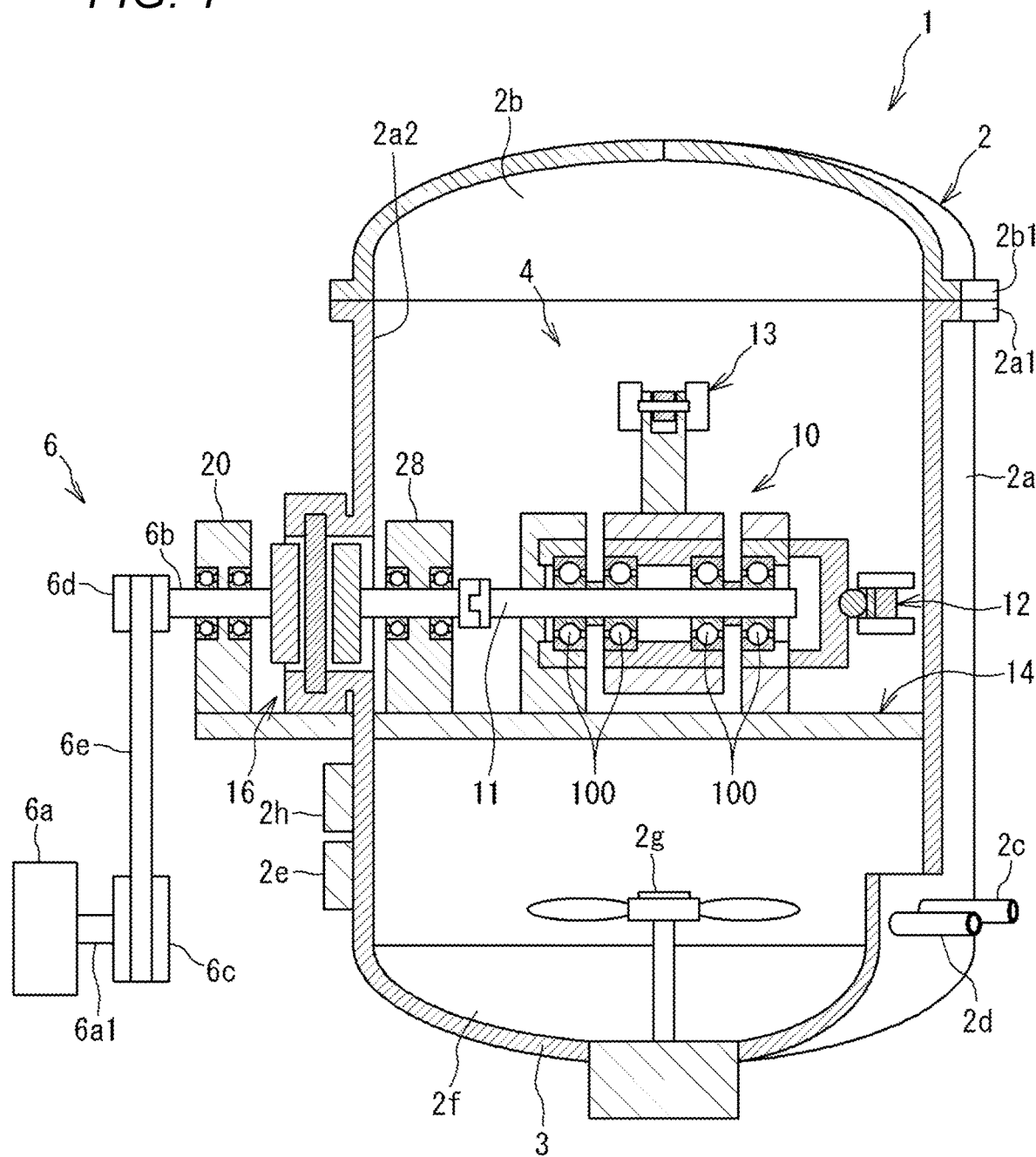
FIG. 1 shows an overall configuration of a rolling bearing test device according to an embodiment.

FIG. 1 shows an overall configuration of a rolling bearing test device according to an embodiment. In FIG. 1, part of the device is cut away to facilitate understanding.

As shown in FIG. 1, the rolling bearing test device 1 is equipped with a hermetic container 2, a bearing holding device 4 which is housed in the hermetic container 2 and holds rolling bearings that are test targets, and a drive device 6.

The hermetic container 2 has a wall portion 3 made of stainless steel or the like and a window portion 31 made of glass or the like and is equipped with a main body 2*a* shaped like a cylinder having a bottom and a top opening and a lid portion 2*b* for closing an opening 2*a*2 of the main body 2*a*. The main body 2*a* has part of the wall portion 3 and the window portion 31 and the whole of the lid portion 2*b* is the remaining part of the wall portion 3. The main body 2*a* has a flange 2*a*1 around the opening 2*a*2. The lid portion 2*b* has a flange 2*b*1 which corresponds to the flange 2*a*1. The flange 2*a*1 and the flange 2*b*1 are confronted with each other via an O-ring or the like and fastened to each other by fastening members such as bolts. As a result, the lid portion 2*b* is fixed to the main body 2*a* in a detachable manner. To dispose equipment, such as the bearing holding device 4, necessary for a test inside the hermetic container 2, the lid portion 2*b* is removed and access is made to the inside of the hermetic container 2 through the opening 2*a*2 of the main body 2*a*.

A bottom portion of the side wall of the hermetic container 2 is provided with an introduction pipe 2*c* for introducing hydrogen gas or another kind of gas (atmosphere gas) to the inside of the hermetic container 2 and an exhaust pipe 2*d* for exhausting gas from inside the hermetic container 2. Two holes penetrate through the wall portion 3 of the hermetic container 2 and the introduction pipe 2*c* and the exhaust pipe 2*d* are connected to the respective holes.

The atmosphere inside the hermetic container 2 is adjusted by introducing gas to the inside of the hermetic container 2 through the introduction pipe 2*c* or exhausting internal gas through the exhaust pipe 2*d*.

The side surface of the hermetic container 2 is provided with a heater 2*e* for increasing the atmosphere temperature inside the hermetic container 2 from outside. Having an electrically-heated wire or the like and shaped like a band and wound on the side surface of the hermetic container 2, the heater 2*e* heats the atmosphere in the hermetic container 2 from outside. As such, the heater 2*e* can increase the atmosphere temperature inside the hermetic container 2 and thereby increase (adjust) the temperatures of rolling bearings 101, 102, 103, and 104. The heater 2*e* can increase the atmosphere temperature inside the hermetic container 2 to about 150° C., for example.

The side surface of the hermetic container 2 is also provided with a cooling device 2*h*. The cooling device 2*h* is shaped like a band and has a flow passage for causing a coolant to flow. Wound on the side surface of the hermetic container 2, the cooling device 2*h* cools the atmosphere existing in the hermetic container 2 by a coolant that flows through the flow passage. In this manner, the cooling device 2*h* can lower the atmosphere temperature inside the hermetic container 2 and thereby decrease (adjust) the temperatures of the rolling bearings 101, 102, 103, and 104. The cooling device 2*h* can lower the atmosphere temperature inside the hermetic container 2 to about −30° C., for example. Equipped with the heater 2*e* and the cooling device 2*h*, the rolling bearing test device 1 can set a temperature in a wide range.

A bottom portion 2*f* of the hermetic container 2 is provided with a rotary fan 2*g*. The rotary fan 2*g* stirs an internal atmosphere of the hermetic container 2 to keep the atmosphere temperature distribution and an atmosphere inside the hermetic container 2 uniform.

The bearing holding device 4 is equipped with a test portion 10 which holds the plural rolling bearings 100 (101, 102, 103, and 104) which are test targets, a rotary shaft 11, a first load application mechanism 12 for applying an axial load to the plural rolling bearings 100, and a second load application mechanism 13 for applying a radial load to the plural rolling bearings 100. The bearing holding device 4 is fixed to a base 14 which is provided fixedly inside the hermetic container 2.

The base 14 is a plate-like member formed using a perforated metal plate. The base 14 is disposed approximately horizontally so as to traverse the internal space of the hermetic container 2. The perforated metal plate, which is a metal plate in which a large number of through-holes are formed, does not prevent passage of an atmosphere in the top-bottom direction though it traverses the internal space of the hermetic container 2. Thus, the temperature and atmosphere in the internal space of the hermetic container 2 is kept uniform even if the base 14 is provided.

The rotary shaft 11 is driven by the drive device 6 which is provided outside the hermetic container 2.

The drive device 6 is equipped with a motor 6*a* for generating drive force for driving the rotary shaft 11, a drive shaft 6*b* which is provided outside the hermetic container 2 and connected to the rotary shaft 11 so as to be able to rotate together with it and serves to drive the rotary shaft 11, a pulley 6*c* attached to an output shaft 6*a*1 of the motor 6*a*, a pulley 6*d* attached to the drive shaft 6*b*, and an endless belt 6*e* which is wound on the pulleys 6*c* and 6*d* and serves to transmit drive force of the output shaft 6*a*1 to the drive shaft 6*b*.

The drive device 6 and the rotary shaft 11 are connected to each other by a non-contact coupling 16.

[About Non-Contact Coupling]

Figure 2:
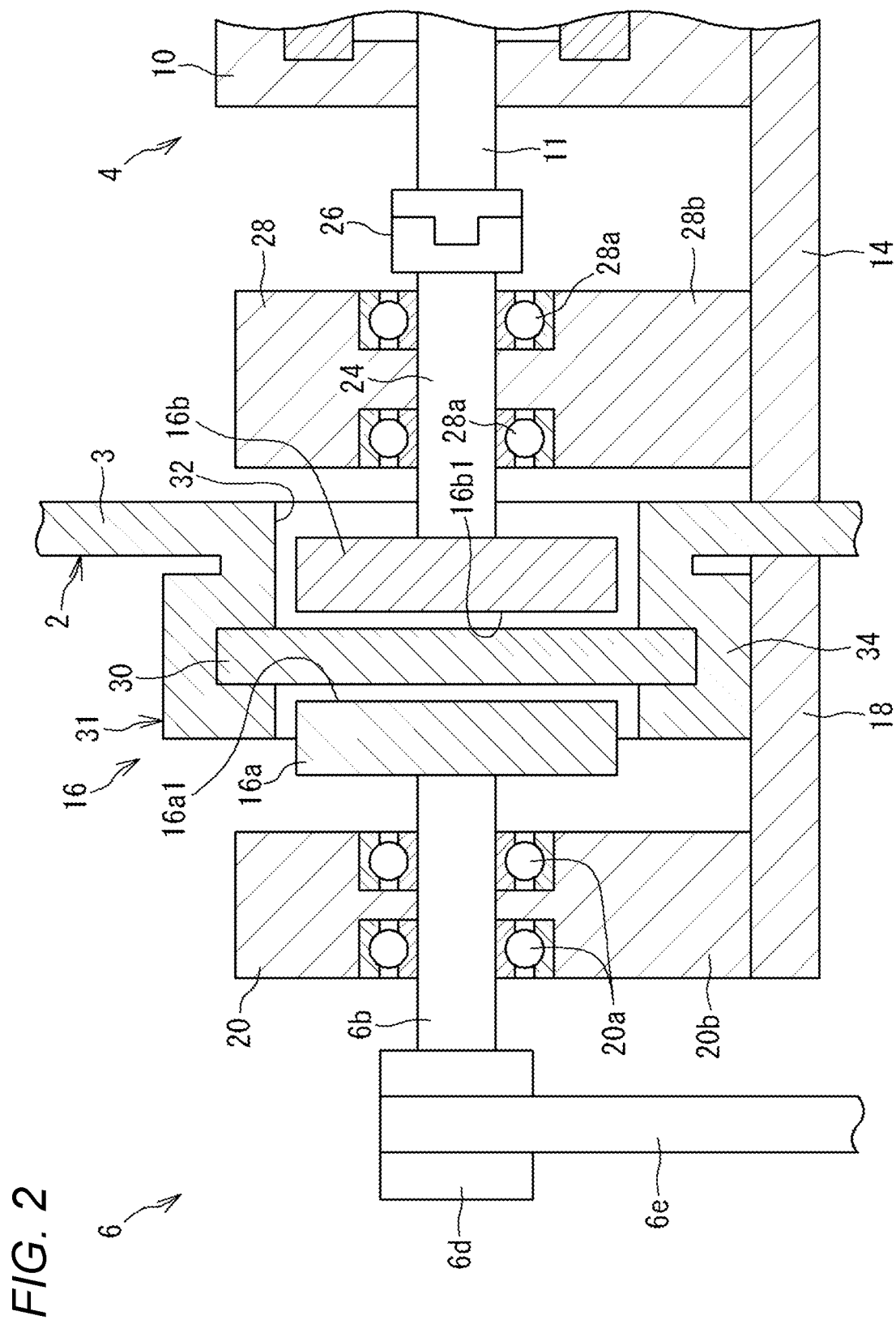
FIG. 2 is a sectional view showing a non-contact coupling and therearound.

FIG. 2 is a sectional view showing the non-contact coupling 16 and therearound.

As shown in FIG. 2, the main body 2*a* of the hermetic container 2 is provided a shelf board 18 at a position corresponding to the non-contact coupling 16. A drive shaft support portion 20 which supports the drive shaft 6*b* so that it is rotatable with respect to the hermetic container 2 is provided on the top surface of the shelf board 18. The drive shaft support portion 20 has a pair of ball bearings 20*a* and a housing 20*b* of the drive shaft support portion 20. The housing 20*b* of the drive shaft support portion 20 is fixed to the shelf board 18. The outer rings of the pair of ball bearings 20*a* are fitted into and fixed to the housing 20*b* of the drive shaft support portion 20 and their inner rings are fitted onto and fixed to the drive shaft 6*b*, whereby the pair of ball bearings 20*a* support the drive shaft 6*b* so that it is rotatable with respect to the hermetic container 2.

The drive shaft 6*b* is provided with the pulley 6*d* on which the endless belt 6*e* is wound as mentioned above, in such a manner that the pulley 6*d* can rotate together with the drive shaft 6*b*.

A connection shaft 24 for connection to the non-contact coupling 16 and a coupling 26 for connecting the connection shaft 24 and the rotary shaft 11 to each other so that they can rotate together are provided adjacent to the end of the rotary shaft 11 extending from the test portion 10 inside the hermetic container 2.

The base 14 is provided with a connection shaft support portion 28 which supports the connection shaft 24 so that it is rotatable with respect to the hermetic container 2. The connection shaft support portion 28 has a pair of ball bearings 28*a* and a housing 28*b* of the connection shaft support portion 28. The outer rings of the pair of ball bearings 28*a* are fitted into and fixed to the housing 28*b* of the connection shaft support portion 28 and their inner rings are fitted onto and fixed to the connection shaft 24, whereby the pair of ball bearings 28*a* support the connection shaft 24 so that it is rotatable with respect to the hermetic container 2.

The center axis of the drive shaft 6b and that of the connection shaft 24 are on the same line.

The non-contact coupling 16 is composed of an outer member 16a which is disposed outside the hermetic container 2 and an inner member 16b which is disposed inside the hermetic container 2.

The outer member 16a is a disc-shaped member and is provided so as to be rotatable together with the drive shaft 6b. A coupling surface 16a1, opposed to a coupling surface 16b1 of the inner member 16b in the axial direction, of the outer member 16a is provided with magnets that are arranged at a prescribed interval in the circumferential direction in such a manner that their polarities vary alternately.

The inner member 16b is a disc-shaped member and is provided so as to be rotatable together with the connection shaft 24. The coupling surface 16b1, opposed to the coupling surface 16a1 of the outer member 16a in the axial direction, of the inner member 16b is provided with magnets that are arranged in a pattern corresponding to the polarity pattern of the coupling surface 16a1 of the outer member 16a. As a result, when the outer member 16a is rotated, the coupling surface 16b1 of the inner member 16b is dragged by the coupling surface 16a1 of the outer member 16a through magnetic forces acting between them, whereby rotational power is transmitted from the outer member 16a to the inner member 16b.

In this manner, the non-contact coupling 16 transmits drive power generated by the drive device 6 to inside the hermetic container 2 without coming into contact with any member located inside the hermetic container 2. The rotary shaft 11 is thereby rotated by the drive power of the drive device 6.

A glass plate 30 is interposed between the outer member 16a and the inner member 16b. A slight gap is formed between the outer member 16a and the glass plate 30. Likewise, a slight gap is formed between the inner member 16b and the glass plate 30.

The glass plate 30 is a member that is part of the window portion 31 which is provided in the wall portion 3 which is part of the hermetic container 2.

The window portion 31 has a circular opening 32 formed in the wall portion 3 and a flange portion 34 which surrounds the opening 32 and into which the glass plate 30 is fitted. The flange portion 34 has a seal (not shown) for sealing between itself and the glass plate 30.

The non-contact coupling 16 transmits rotational power from outside the hermetic container 2 to inside it through the glass plate 30 of the window portion 31 formed in the wall portion 3.

In the embodiment, the insertion of the glass plate 30 between the outer member 16a and the inner member 16b allows high-speed rotation of the non-contact coupling 16. The rotary shaft 11 can be rotated at as high a rotation speed as, for example, 10,000 revolutions per hour, which enables setting of wide-range experimental conditions.

If, for example, a common magnetic body such as a steel plate is interposed between the outer member 16a and the inner member 16b, induction current may flow through the steel plate to heat it up. On the other hand, in the embodiment, since the glass plate 30 which is a non-magnetic body is interposed between the outer member 16a and the inner member 16b, no induction current flows through it and hence it can be prevented from heating up.

Although the embodiment employs the glass plate 30 as a member to be interposed between the outer member 16a and the inner member 16b, instead a member made of a non-magnetic material other than glass may be interposed between the outer member 16a and the inner member 16b.

[About Test Portion]

Figure 3:
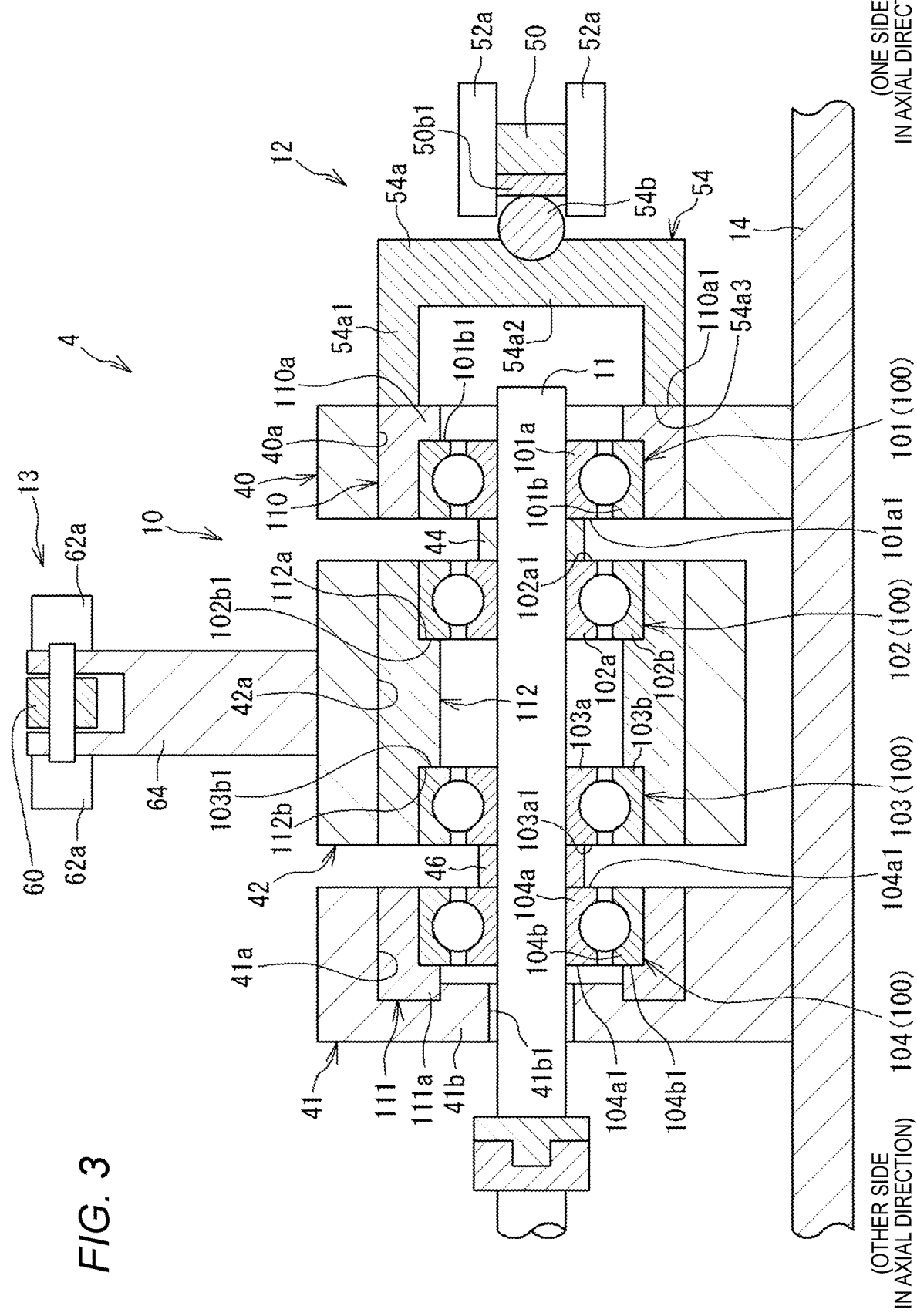
FIG. 3 is a sectional view of a test portion of a bearing holding device.

FIG. 3 is a sectional view of the test portion 10 of the bearing holding device 4.

As shown in FIG. 3, the test portion 10 is divided into three parts, that is, includes a first-side housing 40 which is disposed on one side (tip side) in the axial direction of the rotary shaft 11, a second-side housing 41 which is disposed on the other side in the axial direction of the rotary shaft 11, and a center housing 42 which is disposed between the two housings 40 and 41. The test portion 10 is shaped like a cuboid as a whole.

The four rolling bearings 100 (101, 102, 103, and 104) are fitted onto the rotary shaft 11.

The first-side housing 40 holds the rolling bearing 101 which is disposed at an end position, located on the one side in the axial direction, of the rotary shaft 11. The first-side housing 40 is approximately shaped like a cuboid. The rolling bearing 101 is a deep groove ball bearing having an inner ring 101a and an outer ring 101b.

The first-side housing 40 is mounted on the base 14 and has a cylindrical hole 40a for holding the rolling bearing 101. The cylindrical hole 40a penetrates in the axial direction.

A cylindrical sleeve 110 is fitted onto the outer ring 101b.

The sleeve 110 has a ring-shaped projection 110a which is in contact with a side surface 101b1, located on the one side in the axial direction, of the outer ring 101b.

The rolling bearing 101 is held in the cylindrical hole 40a via the sleeve 110.

The sleeve 110 is set so as to be slidable in the axial direction with respect to the cylindrical hole 40a of the first-side housing 40.

The inner ring 101a is fitted onto and fixed to the rotary shaft 11.

The first-side housing 40 is fixed to the base 14 (fixing portion) and holds the outer ring 101b of the rolling bearing 101 in the cylindrical hole 40a, whereby a shaft support portion is formed which supports a portion, located on the one side in the axial direction, of the rotary shaft 11.

The second-side housing 41 holds the rolling bearing 104 which is disposed at an end position, located on the other side in the axial direction, of the rotary shaft 11. The second-side housing 41 is approximately shaped like a cuboid. The rolling bearing 104 is a deep groove ball bearing having an inner ring 104a and an outer ring 104b.

The second-side housing 41 is mounted on the base 14 and has a cylindrical hole 41a for holding the rolling bearing 104. The cylindrical hole 41a is a hole having a bottom and formed with an opening on the one side in the axial direction. A bottom portion 41b that defines the bottom of the cylindrical hole 41a has a through-hole 41b1 in which the rotary shaft 11 is inserted so as not to be in contact with it.

A cylindrical sleeve 111 is fitted onto the outer ring 104b.

The sleeve 111 has a ring-shaped projection 111a which is in contact with a side surface 104b1, located on the other side in the axial direction, of the outer ring 104b.

The rolling bearing 104 is held in the cylindrical hole 41a via the sleeve 111.

The sleeve 111 is set so as to be slidable in the axial direction with respect to the cylindrical hole 41a of the second-side housing 41.

The inner ring 104a is fitted onto and fixed to the rotary shaft 11.

The second-side housing 41 is fixed to the base 14 (fixing portion) and holds the outer ring 104b of the rolling bearing 104 in the cylindrical hole 41a, whereby a shaft support portion is formed which supports a portion, located on the other side in the axial direction, of the rotary shaft 11.

The bottom portion 41b is in contact with the sleeve 111 so as to form a gap with a side surface 104a1, located on the other side in the axial direction, of the inner ring 104a. As a result, the second-side housing 41 prevents the outer ring 104b from moving from the one side to the other side in the axial direction and is not in contact with the inner ring 104a and the rotary shaft 11.

The center housing 42 holds the rolling bearings 102 and 103 which are disposed between the rolling bearings 101 and 104. The center housing 42 is approximately shaped like a cylinder. The rolling bearing 102 is a deep groove ball bearing having an inner ring 102a and an outer ring 102b. The rolling bearing 103 is a deep groove ball bearing having an inner ring 103a and an outer ring 103b.

The center housing 42 has a cylindrical hole 42a for holding the rolling bearings 102 and 103. The cylindrical hole 42a penetrates in the axial direction.

A cylindrical sleeve 112 is fitted onto the outer rings 102b and 103b.

The sleeve 112 has a step portion 112a which is in contact with a side surface 102b1, located on the other side in the axial direction, of the outer ring 102b and a step portion 112b which is in contact with a side surface 103b1, located on the one side in the axial direction, of the outer ring 103b. The sleeve 112 restricts the interval between the outer rings 102b and 103b in the axial direction by means of the step portions 112a and 112b.

The rolling bearings 102 and 103 are held in the cylindrical hole 42a via the sleeve 112. The sleeve 112 is set so as to be slidable in the axial direction with respect to the cylindrical hole 42a of the center housing 42.

The inner rings 102a and 103a are fitted onto and fixed to the rotary shaft 11.

An arm 64 of a second load application mechanism 13 is fixed to the top surface, in the vertical direction, of the center housing 42 (i.e., the surface located on the side opposite to the base 14 in the vertical direction). The center housing 42 is fixed by the arm 64 so as not to rotate in the circumferential direction. As a result, the center housing 42 holds the outer ring 102b of the rolling bearing 102 and the outer ring 103b of the rolling bearing 103 so that they cannot rotate with respect to the hermetic container 2. That is, the center housing 42 constitutes a holding portion for holding the outer rings 102b and 103b so that they cannot rotate with respect to the hermetic container 2.

A ring-shaped member 44 is disposed between the rolling bearings 101 and 102. The ring-shaped member 44 is disposed adjacent to the outer circumferential surface of the rotary shaft 11 and interposed between the rolling bearings 101 and 102.

The ring-shaped member 44 is in contact with a side surface 101a1, located on the other side in the axial direction, of the inner ring 101a and a side surface 102a1, located on the one side in the axial direction, of the inner ring 102a and restricts the interval between the inner rings 101a and 102a.

A ring-shaped member 46 is disposed between the rolling bearings 103 and 104. The ring-shaped member 46 is disposed adjacent to the outer circumferential surface of the rotary shaft 11 and interposed between the rolling bearings 103 and 104.

The ring-shaped member 46 is in contact with a side surface 101a1, located on the other side in the axial direction, of the inner ring 103a and a side surface 104a1, located on the one side in the axial direction, of the inner ring 104a and restricts the interval between the inner rings 103a and 104a.

[About First Load Application Mechanism and Second Load Application Mechanism]

Figure 4:
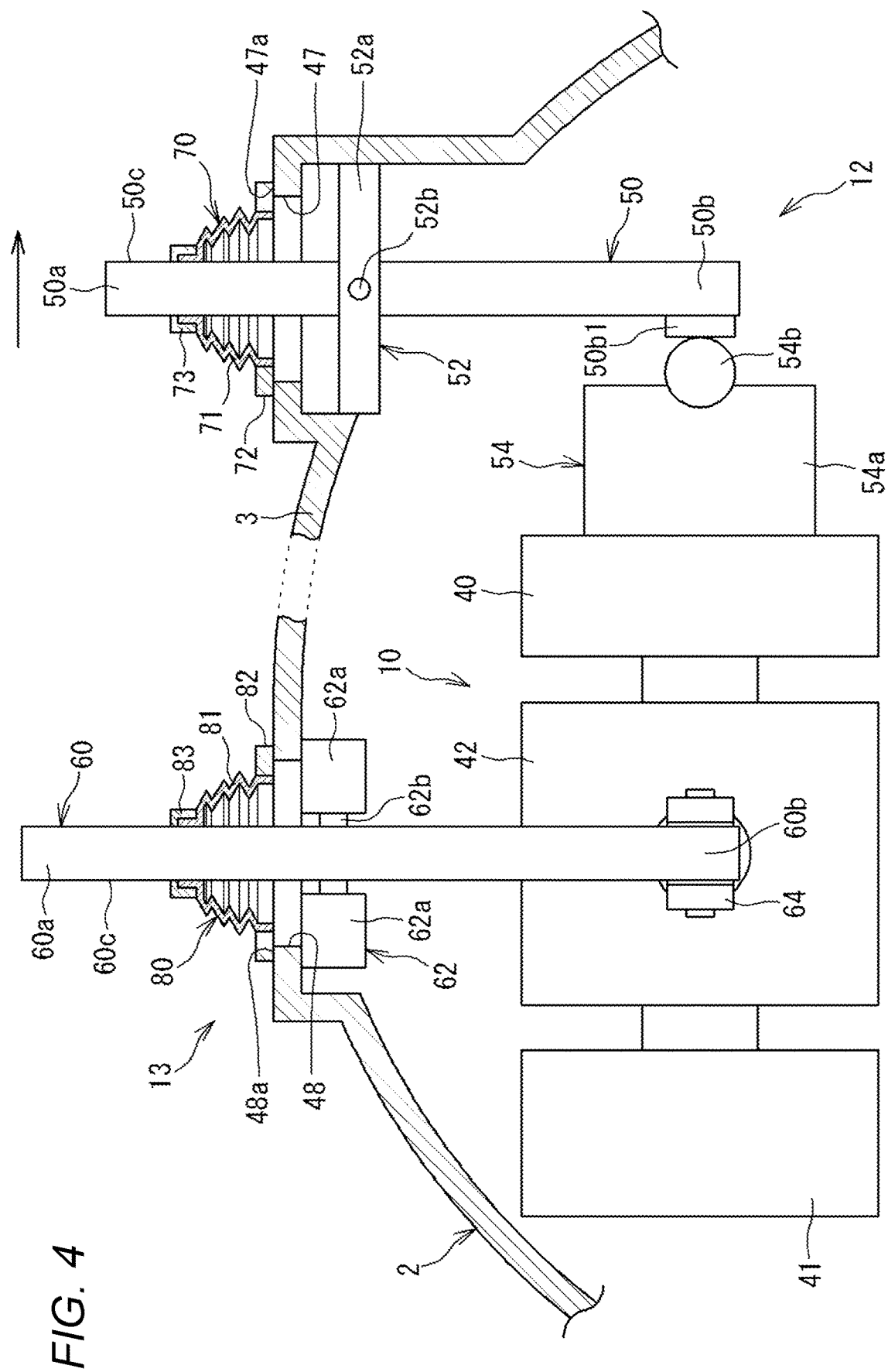
FIG. 4 includes a top view of a test portion in which a peripheral portion of a first load application mechanism and a peripheral portion of a second load application mechanism are drawn as a sectional view.
Figure 5:
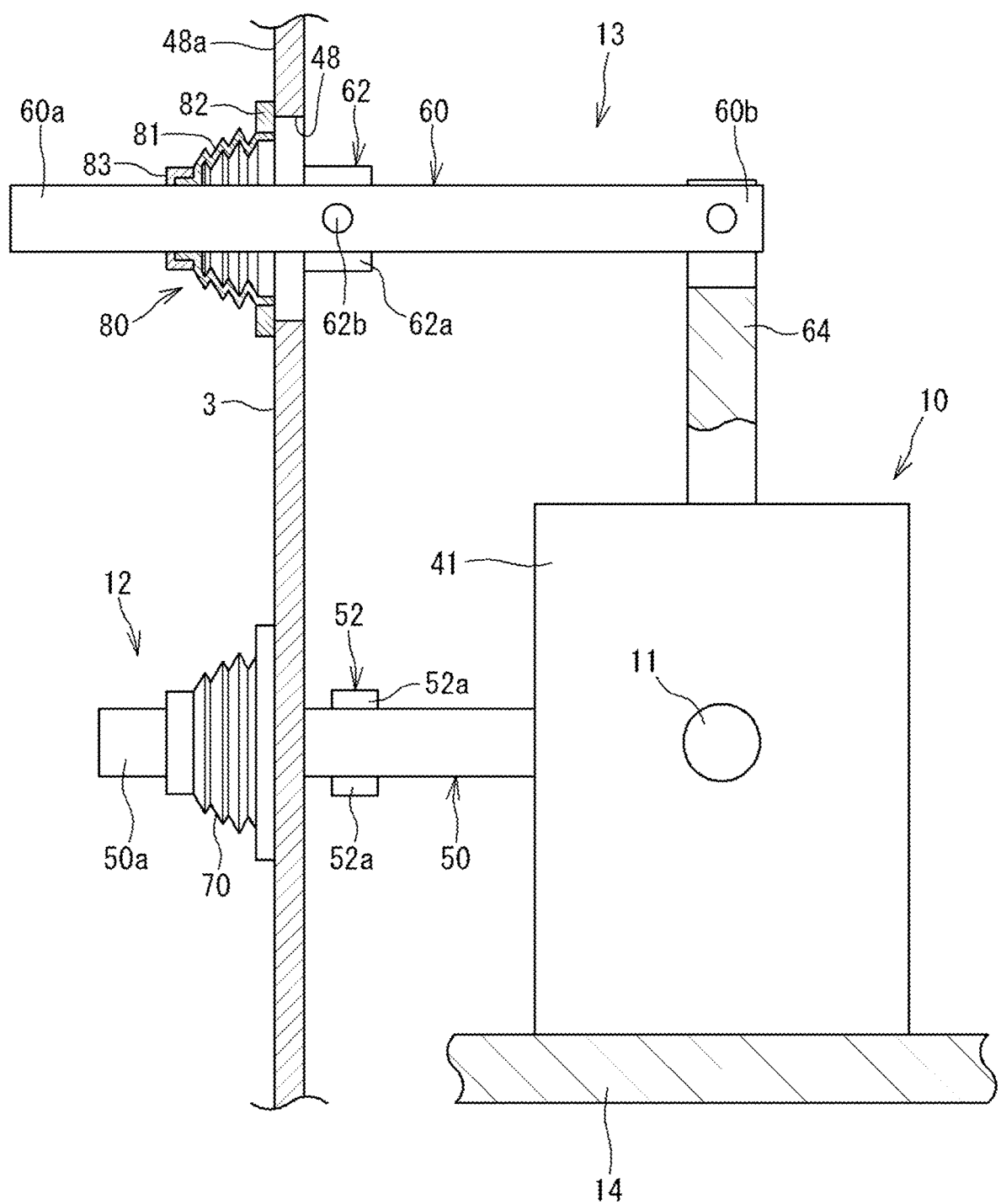
FIG. 5 is a side view of the test portion in which part of the second load application mechanism is drawn as a sectional view.

FIG. 4 is a top view of the test portion 10 in which a peripheral portion of the first load application mechanism 12 and a peripheral portion of the second load application mechanism 13 are drawn as a sectional view. FIG. 5 is a side view of the test portion 10 in which part of the second load application mechanism 13 is drawn as a sectional view.

As shown in FIG. 4, the first load application mechanism 12 is disposed beside the test portion 10 (on the one side (right side on the paper surface) in the axial direction) and applies a load (axial load) to the rolling bearings 101, 102, 103 and 104 in the direction that is parallel with the axial direction of the rotary shaft 11.

The first load application mechanism 12 is equipped with a first beam 50 which is inserted through a first opening 47 which penetrates through the wall portion 3, a first support portion 52 which supports the first beam 50 rotatably, and a pushing portion 54 which pushes, in the axial direction, the outer ring 101b of the rolling bearing 101 which is held by the first-side housing 40.

The first beam 50 is a rod-like member that is rectangular in cross section, and is disposed so as to penetrate through the first opening 47 formed in the wall portion 3. One end portion 50b of the first beam 50 is located inside the hermetic container 2. The other end portion 50a of the first beam 50 is located outside the hermetic container 2.

The first support portion 52 is disposed inside the hermetic container 2. The first support portion 52 is equipped with a pair of support members 52a which are fixed to the inner surface of the wall portion 3 and disposed over and under the first beam 50 and a pin 52b which penetrates through the pair of support members 52a and the first beam 50. The first support portion 52 supports the first beam 50 so that the first beam 50 can rotate about a center axis that is perpendicular to the rotary shaft 11 and does not intersect the center axis of the rotary shaft 11, with the pin 52b as a support point.

With this structure, the first support portion 52 supports the first beam 50 so that the one end portion 50b of the first beam 50 is displaced so that a displacement has a component that is parallel with the axial direction of the rotary shaft 11.

A side surface of the one end 50b of the first beam 50 is provided with a pad 50b1 which is in contact with the pushing portion 54.

As shown in FIGS. 3 and 4, the pushing portion 54 is disposed between the one end portion 50b and the outer ring 101b of the rolling bearing 101. The pushing portion 54 is equipped with a cylindrical member 54a for pushing the outer ring 101b of the rolling bearing 101 toward the other side in the axial direction and a ball 54b which is in contact with the pad 50b1 of the first beam 50.

The cylindrical member 54a is a metal member having a bottomed cylinder shape, and has a cylindrical portion 54a1 and a bottom portion 54a2. A tip surface 54a3 of the cylindrical portion 54a1 is in contact with an end surface 110a1, located on the one side in the axial direction, of the sleeve 110 which holds the outer ring 101b of the rolling bearing 101.

The ball 54b is a spherical metal member provided on an end surface, located on the one side in the axial direction, of the bottom portion 54a2. The ball 54b is provided so that the pushing portion 54 and the contact surface of the first beam 50 make point contact, which allows a load coming from the first beam 50 to act on the pushing portion 54 stably.

The first beam 50 of the first load application mechanism 12 constitutes a "lever" having the pin 52a as a fulcrum. Thus, when a load is imposed on the other end portion 50a of the first beam 50 in a direction indicated by an arrow in FIG. 4, the load imposed on the other end portion 50a is transmitted to the one end portion 50b and pushes the pushing portion 54 toward the other side from the one side in the axial direction. Pushed by the first beam 50, the pushing portion 54 pushes the side surface 101b1 of the outer ring 101b of the rolling bearing 101 held by the first-side housing 40 toward the other side from the one side in the axial direction via the ring-shaped projection 110a of the sleeve 110.

As shown in FIG. 3, the ring-shaped member 44 is interposed between the side surface 101a1 of the inner ring 101a of the rolling bearing 101 and the side surface 102a1 of the inner ring 102a of the rolling bearing 102.

The sleeve 112 having the step portions 112a and 112b is interposed between the side surface 102b1 of the outer ring 102b of the rolling bearing 102 and the side surface 103b1 of the outer ring 103b of the rolling bearing 103.

Furthermore, the ring-shaped member 46 is interposed between the side surface 103a1 of the inner ring 103a of the rolling bearing 103 and the side surface 104a1 of the inner ring 104a of the rolling bearing 104.

The side surface 104b1 of the outer ring 104b of the rolling bearing 104 is in contact with the bottom portion 41b of the second-side housing 41 which is fixed to the hermetic container 2, via the ring-shaped projection 111a of the sleeve 111.

With the above structure, when a load is imposed on the other end portion 50a of the first beam 50 which is located outside the hermetic container 2, the imposed load is transmitted to the one end portion 50b of the first beam 50 via the first beam 50 that is rotated about the pin 52b which is fixed to the hermetic container 2 and serves as the support point. The one end portion 50b of the first beam 50 applies the load imposed on the other end portion 50a to the second-side housing 41 which is fixed to the hermetic container 2. As a result, an axial load is applied between the outer ring 101b and the inner ring 101a of the rolling bearing 101 via the plural balls, an axial load is applied between the inner ring 102a and the outer ring 102b of the rolling bearing 102 via the plural balls, an axial load is applied between the outer ring 103b and the inner ring 103a of the rolling bearing 103 via the plural balls, and an axial load is applied between the inner ring 104a and the outer ring 104b of the rolling bearing 104 via the plural balls.

As shown in FIGS. 4 and 5, the second load application mechanism 13 is disposed over the test portion 10 in the vertical direction (on the side opposite to the base 14 in the vertical direction) and applies a load (radial load) to the rolling bearings 100 in a direction that is parallel with a radial direction of the rotary shaft 11.

The second load application mechanism 13 is equipped with a second beam 60 which is inserted through a second opening 48 which penetrates through the wall portion 3, a second support portion 62 which supports the second beam 60 rotatably, and an arm 64 which connects the second beam 60 and the center housing 42.

The second beam 60 is a rod-like member that is rectangular in cross section, and is disposed so as to penetrate through the second opening 48 formed in the wall portion 3. One end portion 60b of the second beam 60 is located inside the hermetic container 2. The other end portion 60a of the second beam 60 is located outside the hermetic container 2.

The second support portion 62 is disposed inside the hermetic container 2. The second support portion 62 is equipped with a pair of support members 62a which are fixed to the inner surface of the wall portion 3 and disposed on the left and right of the second beam 60 and a pin 62b which penetrates through the pair of support members 62a and the second beam 60. The second support portion 62 supports the second beam 60 so that the second beam 60 is rotatable about a center axis that is parallel with the rotary shaft 11, with the pin 62b as a support point.

With this structure, the second support portion 62 supports the second beam 60 so that the one end portion 60b of the second beam 60 is displaced so that a displacement has a component in a radial direction of the rotary shaft 11.

The arm 64 is connected to the one end portion 60b of the second beam 60 rotatably. The arm 64 extends from the one end portion 60b in a radial direction of the rolling bearings 101, 102, 103, and 104 and is fixed to the top surface, in the vertical direction, of the center housing 42.

The second beam 60 of the second load application mechanism 13 constitute a "lever" having the pin 62a as a fulcrum. Thus, when a load is imposed on the other end portion 60a of the second beam 60 in the vertical direction, the load imposed on the other end portion 60a is transmitted to the one end portion 60b. The load transmitted to the one end portion 60b is applied to the center housing 42 as a radial load via the arm 64.

The rolling bearings 102 and 103 which are held by the center housing 42 is disposed between the first-side housing 40 and the second-side housing 41 which support the rotary shaft 11.

Thus, when, for example, a load is imposed in such a direction as to cause the center housing 42 to go away from the base 14, loads are applied to the outer rings 102b and 103b of the rolling bearings 102 and 103 of the center housing 42 upward in the vertical direction and loads are applied to the inner rings 101a and 104a of the rolling bearings 101 and 104 which are held by the first-side housing 40 and the second-side housing 41, respectively, downward in the vertical direction as reaction forces.

That is, when a load is imposed on the other end portion 60a, located outside the hermetic container 2, of the second beam 60, the imposed load is transmitted to the one end portion 60b of the second beam 60 via the second beam 60 which is rotated with the pin 62b fixed to the hermetic container 2 as a support point. The one end portion 60b of the second beam 60 applies the load imposed on the other end portion 60a to the first-side housing 40 and the second-side housing 41 which are fixed to the hermetic container 2. As a result, a radial load is applied between the inner ring 101a and the outer ring 101b of the rolling bearing 101 via the plural balls, a radial load is applied between the outer ring 102b and the inner ring 102a of the rolling bearing 102 via the plural balls, a radial load is applied between the outer ring 103b and the inner ring 103a of the rolling bearing 103 via the plural balls, and a radial load is applied between the inner ring 104a and the outer ring 104b of the rolling bearing 104 via the plural balls.

As shown in FIG. 4, a bellows 70 is attached to the first beam 50 on the side of the other end portion 50a. The bellows 70 seals up a space between an outer side surface 50c of the first beam 50 and the first opening 47.

The bellows 70 is equipped with a bellows portion 71 made of an elastic material such as rubber or a metal that is hard to permeate hydrogen, a base-side fixing member 72 which is fixed to the wall portion 3, and a tip-side fixing member 73 which is fixed to the first beam 50.

The bellows portion 71 is fixed to the base-side fixing member 72 and the tip-side fixing member 73 so as to stick fast to them.

Furthermore, the base-side fixing member 72 is ring-shaped so as to go along a circumference 47a of the first opening 47 and welded along the entire circumference 47a.

The tip-side fixing member 73 is ring-shaped so as to go along the external shape of the first beam 50 and welded to the outer side surface 50c along its entire circumference. With this structure, the space between the outer side surface 50c of the first beam 50 and first opening 47 is sealed up reliably by the bellows 70.

As shown in FIGS. 4 and 5, as in the case of the first beam 50, a bellows 80 is attached to the second beam 60 on the side of the other end portion 60a. The bellows 80 seals up a space between an outer side surface 60c of the second beam 60 and the second opening 48. The bellows 80 is equipped with a bellows portion 81 made of an elastic material such as rubber or a metal that is hard to permeate hydrogen, a base-side fixing member 82 which is fixed to the wall portion 3, and a tip-side fixing member 83 which is fixed to the second beam 60.

The bellows portion 81 is fixed to the base-side fixing member 82 and the tip-side fixing member 83 so as to stick fast to them.

Furthermore, the base-side fixing member 82 is ring-shaped so as to go along a circumference 48a of the second opening 48 and welded along the entire circumference 48a.

The tip-side fixing member 83 is ring-shaped so as to go along the external shape of the second beam 60 and welded to the outer side surface 60c along its entire circumference. With this structure, the space between the outer side surface 60c of the second beam 60 and second opening 48 is sealed up reliably by the bellows 80.

As described above, in this embodiment, since the bellows 70 which seals up the space between the outer side surface 50c of the first beam 50 and the first opening 47 and the bellows 80 which seals up the space between the outer side surface 60c of the second beam 60 and the second opening 48 are provided, the first opening 47 and the second opening 48 can be sealed up without restricting movement of the first beam 50 and the second beam 60.

[About Operation of Test Device]

To test rolling bearings using the rolling bearing test device 1 having the above configuration, first, the rotary shaft 11 of the test portion 10 of the bearing holding device 4, the first-side housing 40, the second-side housing 41, the center housing 42, the sleeves 110, 111, and 112, the ring-shaped members 44 and 46, and the rolling bearings 101, 102, 103, and 104 are assembled together. As a result, the rotary shaft 11 is supported so as to be rotatable with respect to the housings 40, 41, and 42 in the hermetic container 2.

Subsequently, hydrogen gas is introduced as atmosphere gas into the hermetic container 2 and the rotary shaft 11 is rotated by causing the drive device 6 to operate after the temperature of the hermetic container 2 is set at a prescribed temperature. As a result, the inner rings of the rolling bearings 101, 102, 103, and 104 are rotated with respect to their outer rings.

In this state, if axial loads are applied between the inner rings and the outer rings of the rolling bearings 101, 102, 103, and 104 by the first load application mechanism 12 and a radial load is applied between the center housing 42 and the base 14 by the second load application mechanism 13 while the rotary shaft 11 is rotated, axial loads and radial loads can be applied to the rolling bearings 101, 102, 103, and 104 at the same time in a hydrogen atmosphere. As a result, load conditions that are closer to those in an actual use environment can be reproduced.

In the embodiment, since an axial load and a radial load can be applied to the rolling bearings 101, 102, 103, and 104 by applying loads to the rolling bearings 101, 102, 103, and 104 from outside the hermetic container 2 by means of the first beam 50 and the second beam 60, the degrees of freedom of the manner of applying loads such as load application patterns and applied load values can be increased. Furthermore, temporal variations of applied loads can be monitored from outside the hermetic container 2 via the first beam 50 and the second beam 60 separately for an axial load and a radial load.

In the embodiment, not only the rolling bearings 102 and 103 which are held by the center housing 42 but also the rolling bearings 101 and 104 which support the rotary shaft 11 can be made test targets. Thus, a large number of rolling bearings 100 can be tested by a single test.

[About Another Embodiments]

Figure 6:
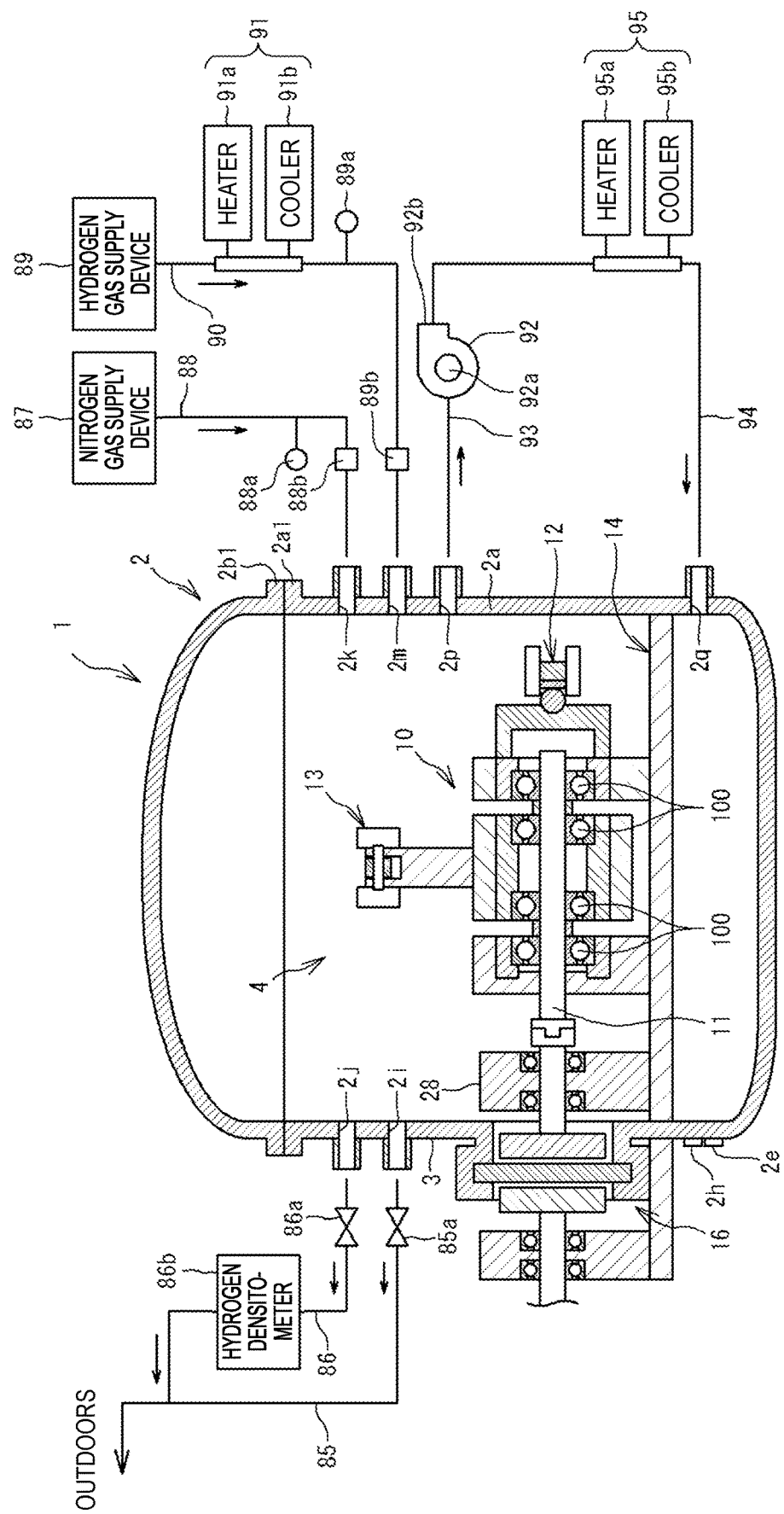
FIG. 6 is a diagram showing an overall configuration of a rolling bearing test device according to another embodiment.

FIG. 6 is a diagram showing an overall configuration of a rolling bearing test device according to another embodiment. FIG. 6 is simplified by drawing pipes connected to the hermetic container 2 in the form of lines. An arrow that is shown alongside each pipe indicates a direction of gas that flows through the pipe.

The rolling bearing test device 1 according to this embodiment is different from the above-described embodiment in that the former is not equipped with a rotary fan for stirring the atmosphere existing in the hermetic container 2 and that the former is equipped with a suction/discharge device 92 for sucking hydrogen gas existing in the hermetic container 2 and discharging the sucked hydrogen gas so that it is introduced to inside the hermetic container 2.

The wall portion 3 of the hermetic container 2 employed in this embodiment is provided with a first exhaust port 2i, a second exhaust port 2j, a first supply port 2k, and a second supply port 2m in place of the introduction pipe 2c and the exhaust pipe 2d employed in the above embodiment. The first exhaust port 2i, the second exhaust port 2j, the first supply port 2k, and the second supply port 2m allow the inside and the outside of the hermetic container 2 to communicate.

An exhaust pipe 85 which leads outdoors is connected to the first exhaust port 2i. The exhaust pipe 85 connects the first exhaust port 2i and an outside facility and leads hydrogen gas existing in the hermetic container 2 outdoors. The exhaust pipe 85 is provided with an open/close valve 85a. The open/close valve 85a is closed when evacuation is not necessary.

A bypass pipe 86 which leads to the exhaust pipe 85 is connected to the second exhaust port 2j. The bypass pipe 86 is provided with an open/close valve 86a and a hydrogen densitometer 86b. The hydrogen densitometer 86b is a device for measuring a hydrogen gas concentration inside the hermetic container 2. The open/close valve 86a is closed usually. To measure a hydrogen gas concentration with the hydrogen densitometer 86b, a small amount of gas inside the hermetic container 2 is sampled and a concentration of hydrogen in the sampled gas is measured.

Thus, the open/close valve 86a is opened in measuring a hydrogen gas concentration in atmosphere gas. When the open/close valve 86a is opened, gas inside the hermetic container 2 is introduced to the hydrogen densitometer 86b and sampled there, whereby a hydrogen concentration is measured. For example, a hydrogen concentration is measurement is performed at intervals of several minutes during a test.

A first supply pipe 88 which leads to a nitrogen gas supply device 87 installed outside the hermetic container 2 is connected to the first supply port 2k. The nitrogen gas supply device 87, which includes a nitrogen cylinder, an open/close valve, a flowmeter, etc., supplies nitrogen gas to inside the hermetic container 2 through the first supply pipe 88. The first supply pipe 88 introduces, to the first supply port 2k, nitrogen gas supplied from the nitrogen gas supply device 87. The nitrogen gas introduced by the first supply pipe 88 is supplied to inside the hermetic container 2 through the first supply port 2k. The first supply pipe 88 is provided with a pressure gauge 88a and a regulator 88b. The pressure gauge 88a measures a pressure on the side of the nitrogen gas supply device 87. The regulator 88b has a function of regulating the supply pressure of nitrogen gas. Nitrogen gas supplied from the nitrogen gas supply device 87 is mainly used for purging the gas existing in the hermetic container 2.

A second supply pipe 90 which leads to a hydrogen gas supply device 89 installed outside the hermetic container 2 is connected to the second supply port 2m. The hydrogen gas supply device 89, which includes a hydrogen cylinder, an open/close valve, a flowmeter, etc., supplies hydrogen gas to inside the hermetic container 2 through the second supply pipe 90. The second supply pipe 90 introduces, to the second supply port 2m, hydrogen gas supplied from the hydrogen gas supply device 89. The hydrogen gas introduced by the second supply pipe 90 is supplied to inside the hermetic container 2 through the second supply port 2m. The second supply pipe 90 is provided with a pressure gauge 89a and a regulator 89b. The pressure gauge 89a measures a pressure on the side of the hydrogen gas supply device 89. The regulator 89b has a function of regulating the supply pressure of hydrogen gas. When hydrogen gas is supplied to inside the hermetic container 2, the supply pressure of the hydrogen gas is regulated by the regulator 89b.

The second supply pipe 90 is also provided with a supply gas heating/cooling device 91 for heating or cooling hydrogen gas passing through the second supply pipe 90. The supply gas heating/cooling device 91 includes a heater 91a and a cooler 91b. The heater 91a and the cooler 91b heats or cools hydrogen gas passing through the second supply pipe 90 by causing it to pass through a heat exchanger or the like that accompanies the second supply pipe 90.

The gas existing in the hermetic container 2 is sampled to measure a hydrogen concentration during a test, and hydrogen gas needs to be supplied additionally by an amount that is equal to a sampled amount.

In supplying hydrogen gas to inside the hermetic container 2, the temperature of the hydrogen gas existing in the hermetic container 2 varies if a difference exists between the temperature of hydrogen gas supplied and that of the hydrogen gas existing in the hermetic container 2. The temperature of the hermetic container 2 varies accordingly. If the temperature of the hermetic container 2 varies, this temperature variation influences the first load application mechanism 12 and the second load application mechanism 13 and may cause variations in loads applied to the rolling bearings.

In contrast, in this embodiment, since the second supply pipe 90 is provided with the supply gas heating/cooling device 91 for heating or cooling hydrogen gas passing through the second supply pipe 90, the temperature of hydrogen gas to be supplied to inside the hermetic container 2 can be adjusted so as to become equal to that of the gas existing in the hermetic container 2 before it is supplied to inside the hermetic container 2, whereby a temperature variation in the hermetic container 2 due to supply of hydrogen gas can be suppressed. As a result, variations of loads applied to the rolling bearings can be suppressed.

The wall portion 3 of the hermetic container 2 employed in this embodiment is provided with a lead-out port 2p and a lead-in port 2q. The lead-out port 2p and the lead-in port 2q allow the inside and the outside of the hermetic container 2 to communicate with each other.

To the lead-out port 2p, a lead-out pipe 93 which leads to the suction/discharge device 92.

To the lead-in port 2q, an introduction pipe 94 which leads to the suction/discharge device 92 is connected.

The suction/discharge device 92 is, for example, a blower, and sucks hydrogen gas through a suction port 92a and discharges hydrogen gas through a discharge port 92b.

The lead-out pipe 93 connects the lead-out port 2p and the suction port 92a of the suction/discharge device 92. The lead-out pipe 93 introduces hydrogen gas that is sucked through the lead-out port 2p to the suction port 92a of the suction/discharge device 92.

The introduction pipe 94 connects the lead-in port 2q and the discharge port 92b of the suction/discharge device 92. The introduction pipe 94 introduces hydrogen gas that is discharged through the discharge port 92b of the suction/discharge device 92 to the lead-in port 2q.

As such, the suction/discharge device 92 sucks hydrogen gas from inside the hermetic container 2 through the lead-out port 2p and discharges the sucked hydrogen gas through the lead-in port 2q so that it is supplied to the hermetic container 2.

With the above structure, a hydrogen gas flow can be generated inside the hermetic container 2 and the hydrogen gas existing in the hermetic container 2 can thereby be stirred.

Furthermore, in this embodiment, since stirring can be performed without installing a rotary fan or the like inside the hermetic container 2, the size of the hermetic container 2 can be reduced.

Incidentally, the suction/discharge device 92 is not restricted to a blower and may be a device having similar functions such as a fan or a pump.

The introduction pipe 94 is provided with an atmosphere gas heating/cooling device 95 for heating or cooling hydrogen gas passing through the introduction pipe 94. The atmosphere gas heating/cooling device 95 includes a heater 95a and a cooler 95b. The heater 95a and the cooler 95b heats or cools hydrogen gas passing through the introduction pipe 94 by causing it to pass through a heat exchanger or the like that accompanies the introduction pipe 94.

With this structure, hydrogen gas that has been heated or cooled is discharged to inside the hermetic container 2 through the lead-in port 2q. Thus, the temperature of the hydrogen gas existing in the hermetic container 2 can be adjusted more efficiently than in, for example, a case of adjusting the temperature of the hydrogen gas by heating or cooling it from outside the hermetic container 2.

The lead-in port 2q is disposed below the base 14 in the vertical direction.

On the other hand, the lead-out port 2p is disposed over the lead-in port 2q in the vertical direction.

Figure 7:
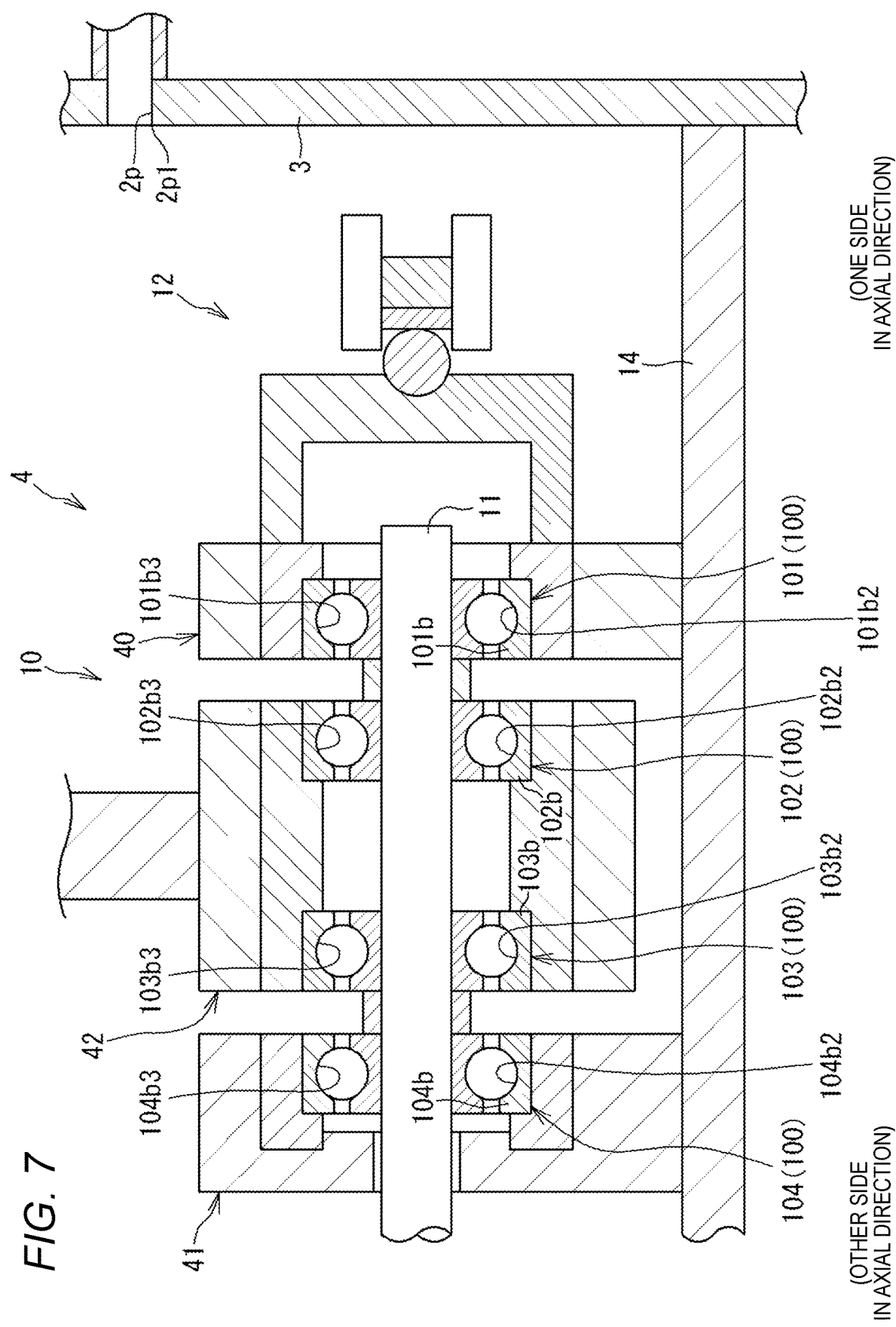
FIG. 7 is a view showing a positional relationship between a lead-out port and rolling bearings that are included in the test portion.

FIG. 7 is a view showing a positional relationship between the lead-out port 2p and the rolling bearings 100 which is included in the test portion 10. FIG. 7 shows a positional relationship between the lead-out port 2p and the rolling bearings 100 in the vertical direction.

As shown in FIG. 7, the lower end 2$p$1, in the vertical direction, of the lead-out port 2$p$ is located above, in the vertical direction, of the uppermost ends 102$b$3 and 103$b$3, in the vertical direction, of outer raceway surfaces 102$b$2 and 103$b$2 of the rolling bearings 102 and 103 which are held by the center housing 42.

The lower end 2$p$1, in the vertical direction, of the lead-out port 2$p$ is located above, in the vertical direction, of the uppermost ends 101$b$3 and 104$b$3, in the vertical direction, of outer raceway surfaces 101$b$2 and 104$b$2 of the rolling bearings 101 and 104 which are held by the first-side housing 40 and the second-side housing 41, respectively, which are parts of the shaft support portions, respectively.

That is, the lead-out port 2$p$ is located above, in the vertical direction, of any of the uppermost ends 102$b$3 and 103$b$3, in the vertical direction, of the outer raceway surfaces 102$b$2 and 103$b$2 of the rolling bearings 102 and 103 and the uppermost ends 101$b$3 and 104$b$3, in the vertical direction, of the outer raceway surfaces 101$b$2 and 104$b$2 which are sliding portions of the pair of shaft support portions.

When rolling bearings are tested, the rolling bearings and shaft support portions that support the rolling bearings wear and produce wear debris. Hydrogen gas containing such wear debris sucked by the suction/discharge device 92 may cause a failure of the suction/discharge device 92.

In this connection, the lead-out port 2$p$ employed in this embodiment is located above, in the vertical direction, any of the uppermost ends 102$b$3 and 103$b$3, in the vertical direction, of the outer raceway surfaces 102$b$2 and 103$b$2 of the rolling bearings 102 and 103 and the uppermost ends 101$b$3 and 104$b$3, in the vertical direction, of the outer raceway surfaces 101$b$2 and 104$b$2 which are the sliding portions of the pair of shaft support portions.

Most of wear debris drops downward in the vertical direction. Thus, wear debris is not prone to be mixed with hydrogen gas that exists in the vicinity of the lead-out port 2$p$ and is to be sucked out through it. As a result, the probability of occurrence of an event that the suction/discharge device 92 sucks wear debris can be lowered and the probability that wear debris affects the suction/discharge device 92 can be suppressed.

In this embodiment, since the rolling bearings 101, 102, 103, and 104 are deep groove ball bearings having the same size, the uppermost ends 101$b$3, 102$b$3, 103$b$3, and 104$b$3 of their respective outer raceway surfaces are almost located at the same position in the vertical direction. However, differences may occur between the positions, in the vertical direction, of the uppermost ends 101$b$3, 102$b$3, 103$b$3, and 104$b$3 of the outer raceway surfaces because ball bearings 101 and 104 which are parts of the shaft support portions are different in size and bearing type from the ball bearings 102 and 103.

Even in such a case, the lead-out port 2$p$ is disposed above, in the vertical direction, of any of the uppermost ends 102$b$3 and 103$b$3, in the vertical direction, of the outer raceway surfaces 102$b$2 and 103$b$2 of the rolling bearings 102 and 103 and the uppermost ends 101$b$3 and 104$b$3, in the vertical direction, of the outer raceway surfaces 101$b$2 and 104$b$2 which are the sliding portions of the pair of shaft support portions. This makes it possible to suppress the probability that wear debris affects the suction/discharge device 92.

Although this embodiment is directed to the example that the lead-in port 2$q$ is disposed below the base 14 in the vertical direction, it suffices that the lead-in port 2$q$ may be located at least under the lead-out port 2$p$ in the vertical direction.

However, where the lead-in port 2$q$ is disposed below the base 14 in the vertical direction, the lead-out port 2$p$ and the lead-in port 2$q$ can be located so as to have a proper distance, the hydrogen gas inside the hermetic container 2 can be stirred more effectively.

[Others]

The invention is not limited to the above embodiments.

Although the above embodiments are directed to the example that hydrogen gas is used as atmosphere gas, another type of gas may be used to reproduce an actual use environment or produce an environment for an acceleration test.

Although the above embodiments are directed to the example that each of the first-side housing 40 and the second-side housing 41 holds the one rolling bearing 101 or 104, it may hold two or more rolling bearings.

Although the above embodiments are directed to the example that the center housing 42 holds the two rolling bearings 102 and 103, it may hold one rolling bearing or three or more rolling bearings.

Although in the above embodiments the rotary shaft 11 is supported rotatably by the rolling bearing 101 with respect to the first-side housing 40 and the rotary shaft 11 is supported rotatably by the rolling bearing 104 with respect to the second-side housing 41, at least one of the rolling bearings 101 and 104 may be a sliding bearing capable of supporting a load in the axial direction and a load in a radial direction.

Although the above embodiments are directed to the example that the rolling bearings are deep groove ball bearings, it suffices that the bearings may be of a type having an inner ring and an outer ring; other types of bearings such as angular ball bearings and tapered roller bearings are also usable The present application is based on Japanese Patent Application No. 2019-109139 filed on Jun. 12, 2019 and Japanese Patent Application No. 2020-076874 filed on Apr. 23, 2020, the disclosures of which are incorporated herein by reference.

REFERENCE SIGNS LIST

1: Rolling bearing test device
2: Hermetic container
2$m$: Second supply port
2$p$: Lead-out port
2$q$: Lead-in port
3: Wall portion
6: Drive device
11: Rotary shaft
12: First load application mechanism
13: Second load application mechanism
14: Base
16: Non-contact coupling
40: First-side housing
41: Second-side housing
42: Center housing
42$a$: Cylindrical hole
44: Ring-shaped member
47: First opening
48: Second opening
50: First beam
50$a$: The other end
50$b$: One end 50c: Outer side surface
52: First support portion
54: Pushing portion
60: Second beam
60a: The other end
60b: One end
60c: Outer side surface
62: Second support portion
64: Arm
70: Bellows
80: Bellows
90: Second supply pipe
91: Supply gas heating/cooling device
92: Suction/discharge device
94: Introduction pipe
95: Atmosphere gas heating/cooling device
100: Rolling bearings
101: Rolling bearing
101a: Inner ring
101b: Outer ring
101b2: Outer raceway surface
101b3: Uppermost end in the vertical direction
102: Rolling bearing
102a: Inner ring
102b2: Outer raceway surface
102b3: Uppermost end in the vertical direction

The invention claimed is:

1. A rolling bearing test device configured to test a rolling bearing comprising an inner ring and an outer ring, the rolling bearing test device comprising:
a hermetic container configured to allow atmosphere gas to be introduced therein;
a rotary shaft housed in the hermetic container and fitted into the rolling bearing;
a pair of shaft support portions fixed to a fixing portion provided in the hermetic container and configured to rotatably support the rotary shaft at both sides of the rolling bearing in an axial direction, respectively;
a drive device configured to drive the rotary shaft;
a holding portion configured to hold the outer ring of the rolling bearing to avoid rotation of the outer ring;
a first load application mechanism configured to apply an axial load between the inner ring and the outer ring of the rolling bearing; and
a second load application mechanism configured to apply a radial load between the inner ring and the outer ring of the rolling bearing by applying a radial load between the holding portion and the fixing portion.

2. The rolling bearing test device according to claim 1, wherein the drive device is provided outside the hermetic container, and
wherein the rolling bearing test device further comprises a non-contact coupling configured to transmit drive power of the drive device to the rotary shaft.

3. The rolling bearing test device according to claim 1, wherein at least one of the pair of shaft support portions comprises a second rolling bearing comprising a second inner ring and a second outer ring and configured to support the rotary shaft,
wherein the rolling bearing test device further comprises a ring-shaped member disposed on an outer circumferential surface side of the rotary shaft and interposed between the second inner ring of the second rolling bearing and the inner ring of the rolling bearing, and
wherein the first load application mechanism is configured to apply the axial load between the inner ring and the outer ring of the rolling bearing via the second rolling bearing and the ring-shaped member by pushing the second inner ring or the second outer ring of the second rolling bearing in the axial direction.

4. The rolling bearing test device according to claim 1, wherein the hermetic container has a supply port allowing an inside and an outside of the hermetic container to communicate, and
wherein the rolling bearing test device further comprises:
a supply pipe configured to introduce, to the supply port, the atmosphere gas to be supplied to the inside of the hermetic container; and
a supply gas heating/cooling device configured to heat or cool the atmosphere gas passing through the supply pipe.

5. A method for testing a rolling bearing using the rolling bearing test device according to claim 1, the method comprising:
fitting the rolling bearing onto the rotary shaft and supporting the rotary shaft rotatably by the pair of shaft support portions in the hermetic container;
introducing the atmosphere gas into the hermetic container; and
causing the rotary shaft to rotate by the drive device while applying the axial load between the inner ring and the outer ring of the rolling bearing by the first load application mechanism and applying the radial load between the inner ring and the outer ring of the rolling bearing by applying the radial load between the holding portion and the fixing portion by the second load application mechanism.

6. The rolling bearing test device according to claim 1, wherein the first load application mechanism comprises:
a first beam penetrating through a wall portion of the hermetic container;
a first support portion configured to support the first beam to allow one end portion of the first beam to be displaced such that a displacement has a component that is in parallel with the axial direction of the rotary shaft; and
a pushing portion provided between the one end portion of the first beam and the inner ring or the outer ring of the rolling bearing, and
wherein the second load application mechanism comprises:
a second beam penetrating through the wall portion of the hermetic container;
a second support portion configured to support the second beam to allow one end portion of the second beam to be displaced such that that a displacement has a component that is in parallel with a radial direction of the rotary shaft; and
an arm connecting the one end portion of the second beam and the holding portion.

7. The rolling bearing test device according to claim 6, further comprising:
a first bellows configured to seal up a space between a first opening which is formed in the wall portion and through which the first beam penetrates and an outer side surface of the first beam; and
a second bellows configured to seal up a space between a second opening which is formed in the wall portion and through which the second beam penetrates and an outer side surface of the second beam.

8. The rolling bearing test device according to claim 1, wherein the hermetic container has a lead-out port allowing an inside and an outside of the hermetic container to communicate and a lead-in port allowing the inside and the outside of the hermetic container to communicate, wherein the rolling bearing test device further comprises a suction/discharge device configured to suck atmosphere gas existing in the hermetic container through the lead-out port and discharge the sucked atmosphere gas so as to be introduced into the hermetic container through the lead-in port, wherein the lead-out port is provided upper in a vertical direction than any of an uppermost end of an outer raceway surface of the rolling bearing in the vertical direction and uppermost ends of sliding portions of the pair of shaft support portions in the vertical direction, and wherein the lead-in port is provided lower than the lead-out port in the vertical direction.

9. The rolling bearing test device according to claim 8, further comprising:

an introduction pipe configured to introduce the atmosphere gas discharged from the suction/discharge device to the lead-in port and an atmosphere gas heating/cooling device configured to heat or cool the atmosphere gas passing through the introduction pipe.

* * * * *